United States Patent
Chao

(10) Patent No.: US 9,454,520 B2
(45) Date of Patent: Sep. 27, 2016

(54) GENERATING A REPRESENTATION OF A LAYOUT HAVING PARTITIONS FOR EXCLUSION ZONES

(75) Inventor: Hui Chao, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1484 days.

(21) Appl. No.: 12/845,845

(22) Filed: Jul. 29, 2010

(65) Prior Publication Data

US 2012/0026187 A1 Feb. 2, 2012

(51) Int. Cl.
G06F 17/24 (2006.01)
G06F 17/21 (2006.01)

(52) U.S. Cl.
CPC ........... *G06F 17/248* (2013.01); *G06F 17/218* (2013.01)

(58) Field of Classification Search
USPC ........................................................ 345/619
See application file for complete search history.

(56) References Cited

U.S. PATENT DOCUMENTS

| | | | | |
|---|---|---|---|---|
| 5,214,755 | A * | 5/1993 | Mason | 715/209 |
| 6,727,909 | B1 * | 4/2004 | Matsumura et al. | 345/629 |
| 7,392,473 | B2 * | 6/2008 | Meunier | 715/247 |
| 2003/0099526 | A1 | 5/2003 | Saw | |
| 2003/0215136 | A1 | 11/2003 | Chao | |
| 2004/0148571 | A1 * | 7/2004 | Lue | G06F 17/30905 715/239 |
| 2004/0205081 | A1 | 10/2004 | Chao | |
| 2005/0071783 | A1 * | 3/2005 | Atkins | 715/851 |
| 2005/0193327 | A1 | 9/2005 | Chao | |
| 2005/0276477 | A1 | 12/2005 | Lin | |
| 2006/0026508 | A1 | 2/2006 | Balinsky | |
| 2006/0103891 | A1 * | 5/2006 | Atkins | 358/450 |
| 2006/0150092 | A1 * | 7/2006 | Atkins | 715/517 |
| 2006/0179405 | A1 | 8/2006 | Chao | |
| 2006/0200758 | A1 * | 9/2006 | Atkins | 715/517 |
| 2006/0236230 | A1 | 10/2006 | Lin | |
| 2006/0257048 | A1 | 11/2006 | Lin | |
| 2006/0259856 | A1 | 11/2006 | Atkins | |
| 2006/0279566 | A1 * | 12/2006 | Atkins et al. | 345/418 |
| 2006/0294460 | A1 | 12/2006 | Chao | |
| 2007/0022003 | A1 | 1/2007 | Chao | |
| 2007/0110335 | A1 | 5/2007 | Taylor | |
| 2007/0253028 | A1 | 11/2007 | Widdowson | |
| 2008/0082912 | A1 | 4/2008 | Atkins | |
| 2008/0205694 | A1 | 8/2008 | Sagoo | |
| 2008/0313533 | A1 * | 12/2008 | Hoyer et al. | 715/243 |
| 2009/0002764 | A1 * | 1/2009 | Atkins et al. | 358/1.18 |
| 2009/0016605 | A1 | 1/2009 | Chao | |
| 2009/0089660 | A1 * | 4/2009 | Atkins et al. | 715/243 |
| 2009/0235158 | A1 * | 9/2009 | Rosenstein et al. | 715/234 |
| 2012/0284595 | A1 * | 11/2012 | Lyons et al. | 715/202 |

OTHER PUBLICATIONS

Hui Chao et al., U.S. Patent Receiving Office, International Appl. No. PCT/US10/43635 entitled "Inserting Content and Exclusion Zone(s) into a Page" filed Jul. 29, 2010 (46 pages).

(Continued)

*Primary Examiner* — Said Broome
(74) *Attorney, Agent, or Firm* — Trop, Pruner & Hu, P.C.

(57) ABSTRACT

A system generates a representation of a layout of a page, where the layout has plural partitions that divide the page, and where the layout specifies one or plural cuts in the page that define the partitions. Exclusion zones are provided in respective partitions, where the exclusion zones define corresponding areas that are free of content that are to be inserted in the page.

26 Claims, 6 Drawing Sheets

(56) References Cited

OTHER PUBLICATIONS

C. Rother, L. Bordeaux, Y. Hamadi and A. Blake, Autocollage. SIGGRAPH'06, 2006 (6 pages).
J. Wang, J. Sun, L. Quan, X. Tang, H.-Y. Shum. Picture Collage, IEEE CVPR 2006 (8 pages).
B. Yang, T. Mei, L.-F. Sun, S.-Q. Yang, X.-S. Hua, Freeshaped video collage, in International Conference on Multi-Media Modeling (MMM). Kyoto, Japan. 2008 (11 pages).
L. Purvis, S. Harrington, B. O'Sullivan and E. Freuder, Creating Personalized Documents: An Optimization Approach, ACM DocEng. 2003 (10 pages).
Badros et al., The Cassowary Linear Arithmetic Constraint Solving Algorithm: Interface and Implementation, Technical Report UW-CSE-98-06-04, Jun. 29, 1998 (31 pages).
www.cs.washington.edu/research/constraints/cassowary/—Cassowary Constraint Solving Toolkit (Cassowary project at SourceForge.net—Nov. 18, 2005 (3 pages).
Badros et al., The Cassowary Linear Arithmetic Constraint Solving Algorithm, ACM Transactions on Computer-Human Interaction, vol. 2, 2002, pp. 1-30.
Geigel et al., Using Genetic Algorithms for Album Page Layouts, IEEE Multimedia, 2003 (pp. 16-26).
Hurst et al., Review of automatic document formatting, ACM DocEng 2009 (pp. 99-108).
Balinsky et al., Aesthetically-Driven Layout Engine, ACM DocEng 2009 (pp. 119-122).
Atkins, Blocked Recursive Image Composition, pp. 821-824 (Oct. 2008).
Atkins, Adaptive Photo Collection Page Layout, 2004 International Conference on Image Processing (CIP), pp. 2897-2900 (2004).
U.S. Appl. No. 13/809,710, Non-Final Rejection dated Feb. 10, 2015, pp. 1-12 and attachments.

\* cited by examiner

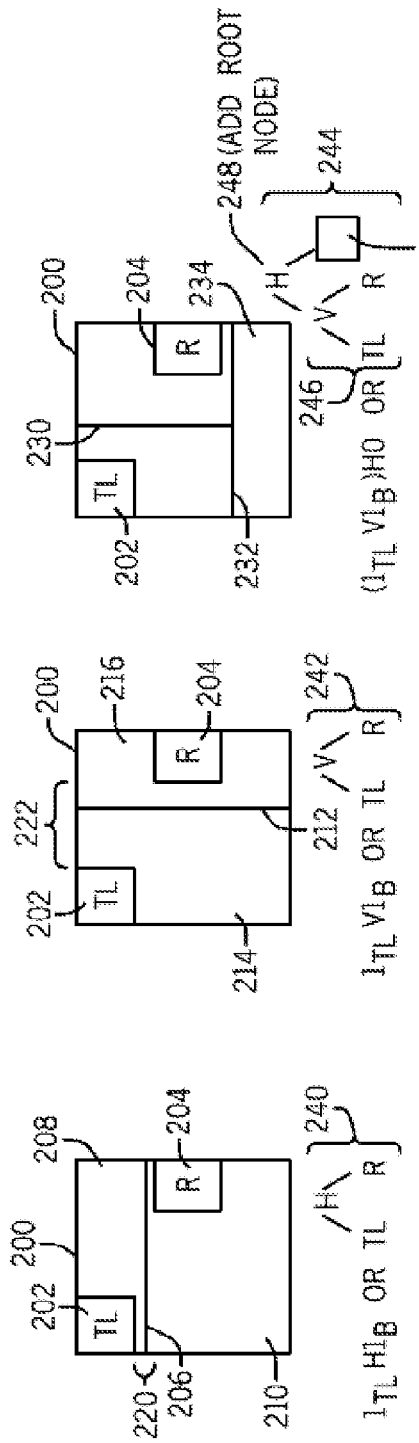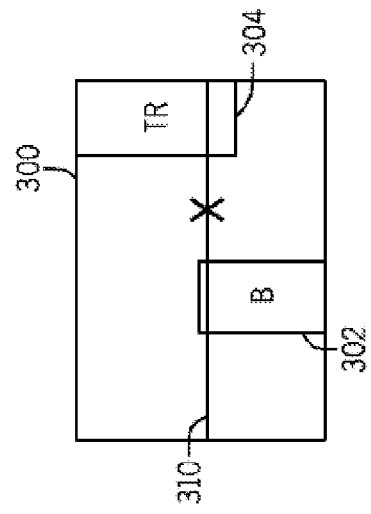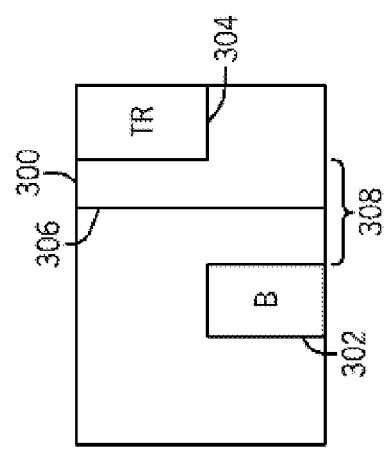

(OPTION 1)

(OPTION 2)

(OPTION 3)

(OPTION 4)

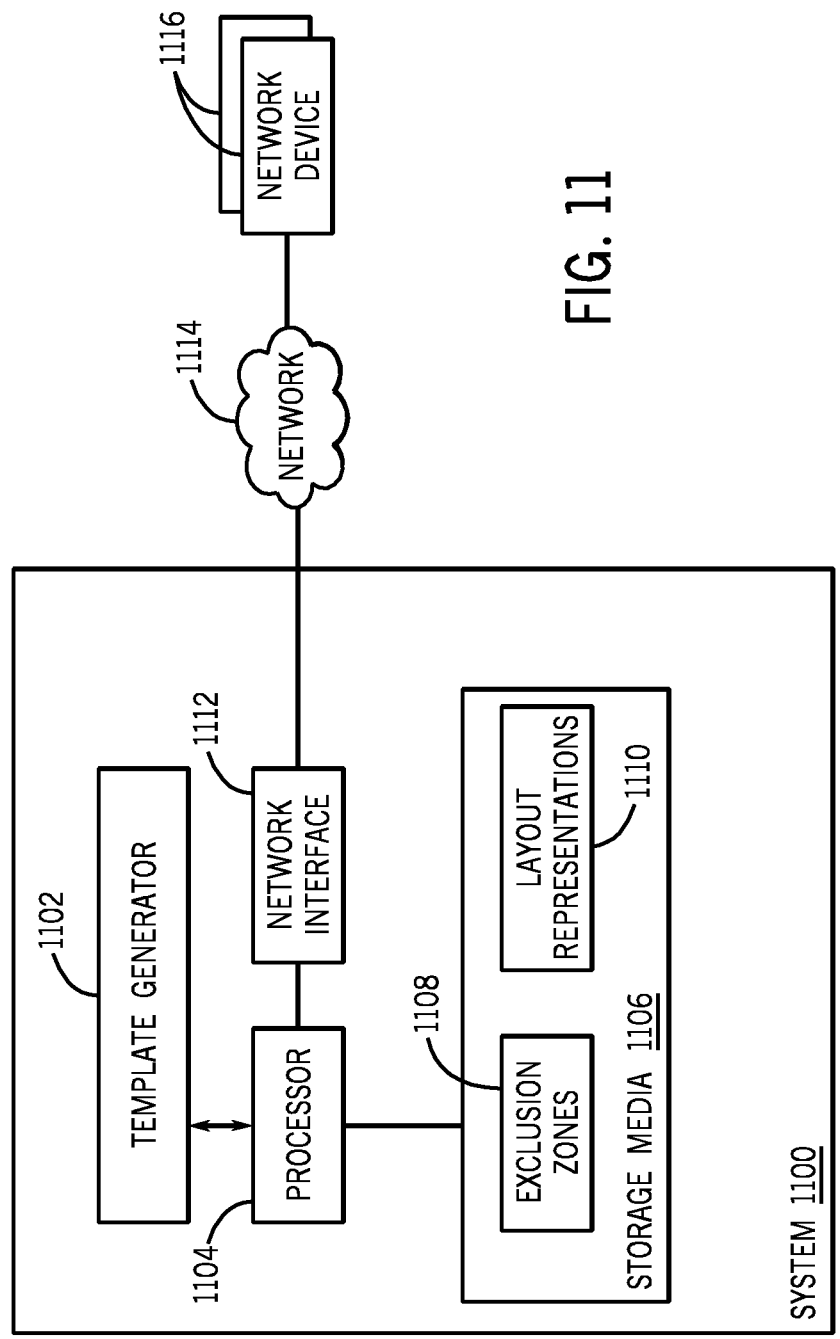

GENERATING A REPRESENTATION OF A LAYOUT HAVING PARTITIONS FOR EXCLUSION ZONES

BACKGROUND

Digital images are easily acquired from various sources, such as over the web, through use of digital cameras, and so forth. An individual or organization may wish to create collages of digital images, where a collage of digital images refers to some arrangement of the images on a page. However, it can be challenging to arrange collections of images onto a page in an efficient manner.

BRIEF DESCRIPTION OF THE DRAWINGS

Some embodiments are described with respect to the following figures:

FIGS. 2A-2C, 3A-3B, 7A-7B, 8A-8B, 9A-9B, and 10 illustrate examples of layouts for containing exclusion zones according to various examples;

FIG. 11 is a block diagram of an example system incorporating some examples.

DETAILED DESCRIPTION

Figure 1:
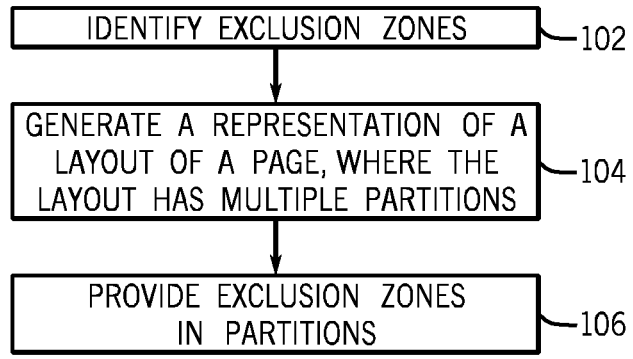
FIG. 1 is a flow diagram of a process according to some examples.

A collage of images arranged on one or multiple pages can be used for various purposes, including storytelling, marketing, project presentation, event highlighting, and so forth. A "page" refers to an overall region on which content (including images) can be placed. A page can also be referred to as a "canvas." The page can be a piece of paper or some other physical object, or the page can be a digital representation of a region in which content is to be provided. In implementations discussed herein, the content that is to be provided on a page (or pages) includes images, such as photographs, an area of text and/or graphics, and so forth. In other implementations, content that can be provided on a page can include other types of content, including physical elements such as patterns drawn on a garment, and so forth.

Various layout algorithms can be provided to dynamically arrange content on a page. However, typical layout algorithms do not account for the presence of exclusion zones on a page. An "exclusion zone" refers to an area on the page that is free of content (e.g., images) to be inserted into the page. In other words, an exclusion zone is an area where content to be placed on the page is not allowed to overlap. Examples of exclusion zones include background artwork or pre-existing text or graphics in specific locations of the page. Exclusion zones can also merely be blank spaces on the page where an author wishes not to have content be placed. Given a collection of content to be placed on a page, techniques or mechanisms according to some implementations are provided that enable placement of the content on the page that considers the presence of exclusion zone(s) on the page.

In the ensuing discussion, reference is made to inserting or placing images onto a page. In alternative implementations, techniques or mechanisms discussed below can be applied for placing or inserting other content on a page.

Techniques or mechanisms according to some implementations are used to generate candidate templates that contain exclusion zones, where the candidate templates are used as starting points for insertion of images of a collection. Each candidate template is defined by a corresponding layout that has plural partitions for dividing a page, where exclusion zones on the page are located in respective ones of the partitions. Each layout is represented by a representation that specifies one or multiple cuts in the page that define the partitions.

In some implementations, a "cut" refers to a dividing structure that divides a portion of a page into different parts. Note that the dividing structure is not necessarily visible in the output that is generated for the layout—the dividing structure is typically a logical construct used for defining partitions on a given page.

In some implementations, the cuts are horizontal cuts or vertical cuts. A horizontal cut refers to a horizontal dividing structure that divides a portion of a page between an upper part and a lower part. A vertical cut refers to a vertical dividing structure that divides a portion of a page between a left part and a right part.

The representation of a layout that has multiple partitions containing respective exclusion zones can be in the form of a tree that has an arrangement of nodes, including leaf nodes and non-leaf nodes. The leaf nodes of the tree define areas on the page for exclusion zones and/or images, while the non-leaf nodes represent cuts, either horizontal cuts or vertical cuts. Such a tree is also referred to as an arrangement of guillotinable structures, where an arrangement of guillotinable structures define a guillotinable layout that can be successively divided by the addition of horizontal and/or vertical cuts.

FIG. 1 is a flow diagram of a process according to some examples. The process of FIG. 1 can be performed by a system having a processor. Exclusion zones on a page onto which images (or other content) are to be placed are identified (at 102). The system then generates (at 104) a representation (e.g., a tree as discussed above) of a layout of the page, where the layout has multiple partitions that divide the page. The identified exclusion zones are provided (at 106) in respective ones of the partitions. Depending on the number of exclusion zones on the page, the generation of the representation (e.g., a tree) can be performed in a recursive manner, in which vertical and/or horizontal cuts are successively added to define additional partitions for containing additional exclusion zones. The representation of the layout that is generated provides a candidate template containing exclusion zones, where images (or other content) can be inserted into this template.

In some implementations, note that for a given set of exclusion zones, there can be multiple possible layouts that specify different arrangements of partitions on a page. These multiple possible layouts are considered candidate layouts that can be used to form the templates that are to be used for inserting images (or other content).

FIGS. 2A-2C illustrate three possible layouts given presence of exclusion zones 202 and 204 on a page 200. FIG. 2A shows a horizontal cut 206 that divides the page 200 between an upper partition 208 and a lower partition 210, where the upper partition 208 contains the exclusion zone 202 and the lower partition 210 contains the exclusion zone 204.

FIG. 2B shows a different layout, which includes a vertical cut 212 to divide the page 200 into a left partition 214 and a right partition 216 for containing the exclusion zones 202 and 204, respectively. Note that in the examples of FIGS. 2A and 2B, both layouts are valid layouts, since each of the horizontal cut 206 and vertical cut 212 can be defined without intersecting any of the exclusion zones 202 and 204. Effectively, in FIG. 2A, there is a horizontal gap 220 between the exclusion zones 202 and 204, such that the horizontal cut 206 can be provided in this gap 220. Similarly, in FIG. 2B, there is a gap 222 between the exclusion zones 202 and 204, where the vertical cut 212 can be provided in this gap 222.

In a different example, as shown in FIGS. 3A-3B, exclusion zones 302 and 304 are present on a page 300. In FIG. 3A, a vertical cut 306 is depicted, which is a valid cut since the vertical cut 306 can be provided in a vertical gap 308 between the exclusion zones 302 and 304. On the other hand, as depicted in FIG. 3B, a horizontal cut 310 is not a valid cut for the exclusion zones 302 and 304, since there is no horizontal cut 310 that is possible that does not intersect any of the exclusion zones 302 and 304. In other words, there is no horizontal gap existing between the exclusion zones 302 and 304. Therefore, for the exclusion zones 302 and 304 on the page 300, the layout corresponding to the horizontal cut 310 is considered to be an invalid layout that cannot be used as a template.

FIG. 2C illustrates a different layout in which, after a vertical cut 230 was defined between the exclusion zones 202 and 204, a horizontal cut 232 has been added. The addition of the horizontal cut 232 refers to a mutation of the tree that represents the layout of FIG. 2C by adding a root node to the tree that corresponds to the horizontal cut 232. Note that the addition of the horizontal cut 232 defines a partition 234 that does not contain an exclusion zone. This partition 234 is considered an empty partition that can be used for placement of an incoming image or another exclusion zone, for example.

According to some implementations, to allow for efficient computation of representations of candidate layouts given a collection of exclusion zones, an encoding scheme is employed that defines different codes corresponding to different locations of exclusion zones. There are nine possible positions of an exclusion zone: TL, which represents the top, left corner of the page; TR, which represents the top, right corner of the page; BL, which represents the bottom, left corner of the page; BR, which represents the bottom, right corner of the page; T, which represents a top position on the page; B, which represents a bottom position on the page; L, which represents a left position on the page; R, which represents the right position on the page; and M, which represents a middle position on the page.

Figure 4A:
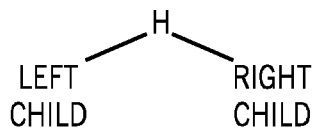
FIGS. 4A-4B illustrate a tree having a horizontal cut and a tree having a vertical cut, respectively, in accordance with some examples.
Figure 4B:
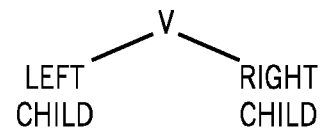

When forming a tree (to represent a layout of exclusion zones) given a particular location of an exclusion zone, the location of the exclusion zone can constrain where the exclusion zone is to be placed relative to a corresponding cut, either a horizontal cut or a vertical cut. Each of FIGS. 4A and 4B illustrates a portion of a tree that represents a portion of a layout. "H" in FIG. 4A represents a horizontal cut, which "V" in FIG. 4B represents a vertical cut. In the tree of FIG. 4A, H has two child nodes, a left child node, and a right child node. The left child node in FIG. 4A represents the upper partition above the horizontal cut represented by H, whereas the right child node represents the lower partition below the horizontal cut (H). In FIG. 4B, the left child node represents the left partition of the vertical cut represented by V, whereas the right child node represents the right partition of the vertical cut (V).

In FIG. 2A, the exclusion zone 202 is in the TL position, whereas the exclusion zone 204 is in the R position. Thus, the tree that represents the layout of FIG. 2A is depicted as 240 in FIG. 2A, where "TL" represents exclusion zone 202, and R represents exclusion zone 204, while H represents the horizontal cut 206. A tree 242 represents the layout of FIG. 2B, while a tree 244 represents the layout of FIG. 2C. In the tree 244 of FIG. 2C, a sub-tree 246 was formed after addition of the vertical cut 230 but before addition of the horizontal cut 232. To add the horizontal cut 232, a root node (H) 248 was added. A left child node of the root node 248 is the sub-tree 246, while the right child node of the root node 248 is an empty slot 250 that corresponds to the empty partition 234 in FIG. 2C.

For an exclusion zone of a given type, there are several possible ways to start a tree. These possibilities (referred to as "branch kernels") are depicted in Table 1 below:

TABLE 1 the possible branch kernels for each type of exclusion zone

| Exclusion zone type | TL | TR | BL | BR | T | B | L | R | M |
|---|---|---|---|---|---|---|---|---|---|
| Possible ways to start a tree | $1_{TL}H0$ $1_{TL}V0$ | $1_{TR}H0$ $0V1_{TR}$ | $0H1_{BL}$ $1_{BL}V0$ | $0H1_{BR}$ $0V1_{BR}$ | $1_T H0$ $1_T V0$ $0V1_T$ | $0H1_B$ $1_B V0$ $0V1_B$ | $1_L V0$ $1_L H0$ $0H1_L$ | $0V1_R$ $1_R H0$ $0H1_R$ | $1_M H0$ $0H1_M$ $1_M V0$ $0V1_M$ |

For example, given exclusion zone type TL, the possible ways to start a tree are represented by the following codes in Table 1: $1_{TL}H0$; $1_{TL}V0$. The code $1_{TL}H0$ indicates that a horizontal cut (H) has been formed, with the exclusion zone at location TL provided as the left child node of H. The "1" value indicates that the corresponding child node is occupied by the exclusion zone, whereas the "0" value in the code indicates that a vacant position can be filled with another node, such as a leaf node or another branch (that includes a sub-tree). Note that for an exclusion zone of the M type, there are four possible ways to start a tree—in other words, a cut can be placed on the left, right, top, or bottom of the exclusion zone in the middle.

In FIG. 2A, for exclusion zone 202 (of type TL), the corresponding code value given the horizontal cut 206 is $1_{TL}H0$. For the exclusion zone 204, (of type B), the code given the horizontal cut 206 above the exclusion zone 204 is $0H1_B$. The combination of these codes ($1_{TL}H0+0H1_B$) is $1_{TL}H1_B$, which is the code that represents the tree 240 (FIG. 2A) As shown in FIG. 2B, the combined code for the exclusion zones 202 and 204 given the vertical cut 212 is $1_{TL}V1_B$ ($1_{TL}V0+0V1_B$).

The combined code for the tree 244 shown in FIG. 2C starts with the code ($1_{TL}V1_B$) of FIG. 2B. Once the root node 248 in FIG. 2C is added, the code becomes ($1_{TL}V1_B$)H0.

If there is just one exclusion zone on a page, then the possible layouts given this one exclusion zone is represented by the trees corresponding to the possible codes indicated in Table 1 above. For example, if the exclusion zone is of type M, then there would be four possible layouts corresponding to the four codes listed in the last column of Table 1. These four possible layouts would be considered the four candidate layouts to be used as four corresponding templates for insertion of images on the left, right, top, or bottom of this exclusion zone.

If there are two exclusion zones on a page, then the possible layouts are formed by combining respective pairs of codes corresponding to the two exclusion zones. A code for the first exclusion zone can be combined with a code for the second exclusion zone if the respective codes represent the same type of cut (either the horizontal cut or a vertical cut). For example, if the first exclusion zone is of type TL and the second exclusion zone is of type B, then the code $1_{TL}H0$ for exclusion zone TL can be combined with code $0H1_B$ for exclusion zone B, since these are the codes for a horizontal cut. It is not valid to combine $1_{TL}H0$ with $0V1_B$, for example, since $0V1_B$ corresponds to a vertical cut layout for exclusion zone B while $1_{TL}H0$ corresponds to a horizontal cut for exclusion zone TL. Moreover, another restriction is that after combination, the code has to have form 1H1 or 1V1. Combining code $1_{TL}V0$ for exclusion zone TL with code $1_BV0$ for exclusion zone B would not be a valid combination, since that would not result in form 1V1, where one exclusion zone occupies the left child node and one exclusion zone occupies the right child node. Stated differently, two exclusion zones cannot both occupy the same child node of a respective cut node (a cut node represents a cut, either a horizontal cut or a vertical cut).

Figure 5:
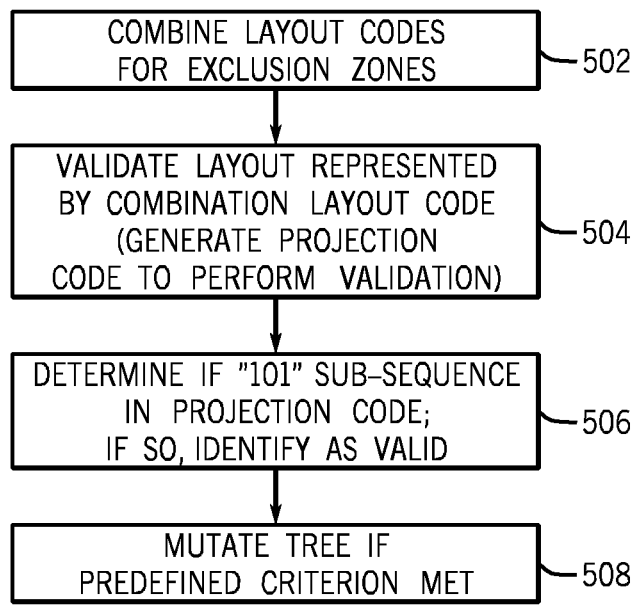
FIG. 5 is a flow diagram of a process according to further examples.

FIG. 5 is a flow diagram of techniques according to alternative implementations for forming a layout for two exclusion zones. The layout codes of the corresponding two exclusion zones for the same type of cut are combined (at 502) to form a combination layout code. In other words, a layout code for the first exclusion zone for a horizontal cut can be combined with a layout code of a second exclusion zone for a horizontal cut. Similarly, a layout code for the first exclusion zone for a vertical cut can be combined with a layout code for a second exclusion zone for a vertical cut. The combination performed at 502 is subject to the restriction that the combination has to produce output of form 1H1 or 1V1 (in other words, the output layout is of the form where the two exclusion zones occupy two different respective child nodes of the corresponding cut node).

After combining the layout codes of the respective exclusion zones to form a combination layout code, the corresponding layout represented by the combination layout code is validated (at 504). The validation checks to see whether the corresponding cut (horizontal cut or vertical cut) intersects any of the exclusion zones. In the example of FIG. 2A or 2B, the horizontal cut 206 or vertical cut 212 would be considered a valid cut since neither intersects any part of exclusion zone 202 or 204. On the other hand, the horizontal cut 310 shown in FIG. 3B is not a valid cut, since it intersects at least one of the exclusion zones 302 and 304. Therefore, the layout of FIG. 3B would be considered an invalid layout.

Validating whether a particular cut is valid is based on checking a vertical projection (for a horizontal cut) or a horizontal projection (for a vertical cut).

Consider a two-dimensional page of pixels with pixel value at [i, j] position represented as p[i][j]:
If [i, j] it is not inside either one of the blocks representing exclusion zones, then p[i][j]=0;
else p[i][j]=1; (the pixel is enclosed inside one of the exclusion zones).

A horizontal projection value h[j]=1 if the sum of the pixel values along the jth column is larger than 0, else h[j]=0. Similarly a vertical projection value v[i]=1 if the sum of the pixel values along the ith row is larger than 0, else v[i] is 0. More formally, $$h[j] = \begin{cases} 1 & \text{if } \sum_i p[i][j] > 0 \\ 0 \end{cases}$$

$$v[i] = \begin{cases} 1 & \text{if } \sum_j p[i][j] > 0 \\ 0 \end{cases}$$

Given the horizontal cut, a vertical projection code is formed by a sequence of the vertical projection values v[i], i=0, 1, . . . , n, where n represents the number of rows of pixels on the page. Such sequence of the vertical projection values v[i] for the example of FIG. 2A is 111 . . . 1000111.1000 . . . , for example. The "1" values occur where a row i on the page 200 includes a part of the exclusion zone 202 or 204. The "0" values occur where a row i on the page 200 includes neither the exclusion zone 202 nor exclusion zone 204. Continuous "1"s are collapsed into a single "1" while continuous "0"s are collapsed into a single "0" value. Thus, in the foregoing example, collapsing of the "1"s and "0"s would result in the following vertical projection code: 1010.

For the example of FIG. 3B, the sequence of vertical projection values v[i], i=1, 2, . . . , n, can be as follows, for example: 111111 . . . 11. Note that in this sequence, there are no "0"s, since all the rows i intersect at least one of the exclusion zones 302 and 304. Collapsing the foregoing continuous "1"s results in the following vertical projection code: 1.

Referring again to FIG. 5, it is determined (at 506) whether the projection code produced at 504 has a "101" sub-sequence in the string. If so, then the corresponding cut is a valid cut. For the example of FIG. 2A, where the projection code is 1010, there is a sub-sequence "101" in the projection code, and therefore, the cut 206 is a valid cut. On the other hand, since the projection code (1) for the horizontal cut 310 of FIG. 3B does not have a sub-sequence "101", the horizontal cut 310 of FIG. 3B is an invalid cut. The sub-sequence "101" indicates that there is a gap, represented by the "0" in the sub-sequence, in which a valid cut can be provided without intersecting any exclusion zone.

Computing the vertical or horizontal projection code to validate a cut is a relatively efficient way of performing such validation, since the vertical or horizontal projection code can be quickly computed, and the search for presence of the sub-sequence "101" is a relatively fast process.

In addition, in accordance with some implementations, the tree produced by making the corresponding cut can be mutated (at 508) if predefined criteria are satisfied. As discussed above in connection with FIG. 2C, the mutation of the tree is performed by adding a root node to a tree (e.g., adding root node 248 in FIG. 2C). Adding a root node is possible if there is a "01" at the beginning of the projection code, or a "10" at the end of the projection code. In one example, assume that the current valid tree is 1H1. If the projection code for this tree starts with a "01", then it is possible to add a root node (V) to form 0V(1H1). On the other hand, if the projection code ends with a "10", then it is possible to add a root node (V) to form the following tree: (1H1)V0.

Similar addition of root nodes are possible for a valid tree 1V1, to form one of the following: 0H(1V1) or (1V1)H0.

In task 508, the projection code that is checked for 1H1 is the horizontal projection code, whereas the projection code that is checked for 1V1 is the vertical projection code. Note that such checking differs from the checking performed at 506, where the vertical projection code is checked for 1H1 to determine whether the horizontal cut is valid, and the horizontal projection code is checked for 1V1 to determine whether the vertical cut is valid.

Additional exclusion zones can be added after the first two exclusion zones. To add an additional exclusion zone, the layout technique attempts to insert the additional exclusion zone at different tree node locations, with the placement validated by checking the cuts of the parent nodes and the sibling node. For any existing node in a previous tree, there are four options to add a new exclusion zone by replacing the existing node with one of the trees depicted in FIGS. 6A-6D. FIGS. 6A-6D depict options 1-4, respectively. Starting with the exclusion zones 202 and 204 shown in FIGS. 2A-2C (which include TL and the R exclusion zones), it is assumed that it is desired to add a B exclusion zone. Starting with the tree depicted in FIG. 2A, represented by code $1_{TL}H1_B$, there is no valid insertion at node position TL in tree 240 shown in FIG. 2A, because the parent node has the "H" cut and TL is a left (or top) child. However, at the "R" node position in the tree 240 of FIG. 2A, for the "B" exclusion zone, option 2 and option 3 (depicted in FIGS. 6B and 6C) are possible insertions at the "R" node position. The option 2 insertion is depicted in FIG. 7A whereas the option 3 insertion is depicted in FIG. 7B.

Figure 6A:
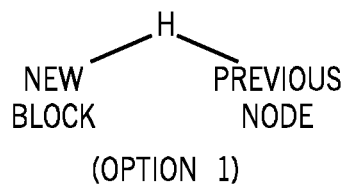
FIGS. 6A-6D illustrate various options of branches that can be inserted into trees representing layouts, in accordance with some examples.
Figure 6B:
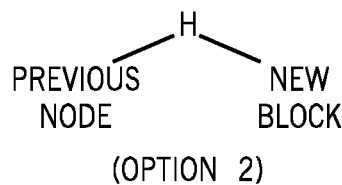
Figure 6C:
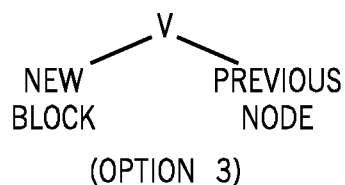
Figure 6D:
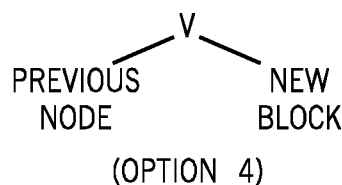
Figure 7A:
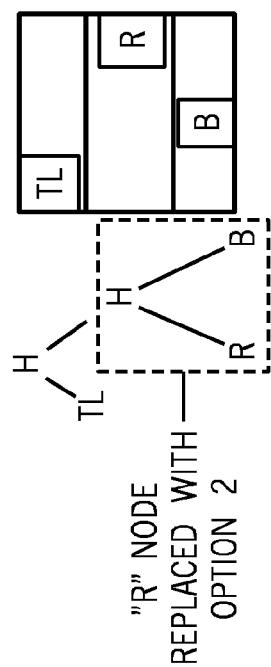
Figure 7B:
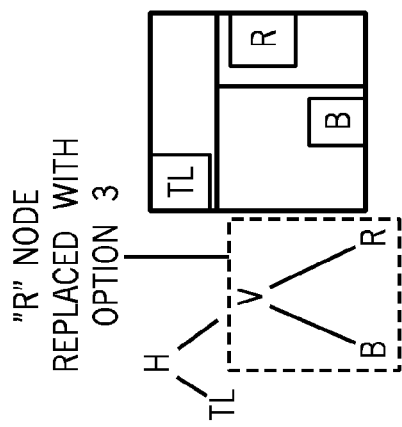
Figure 8A:
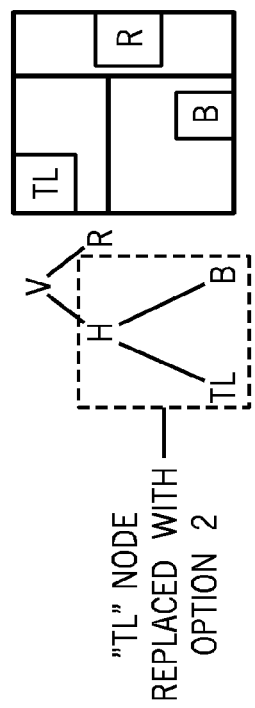
Figure 8B:
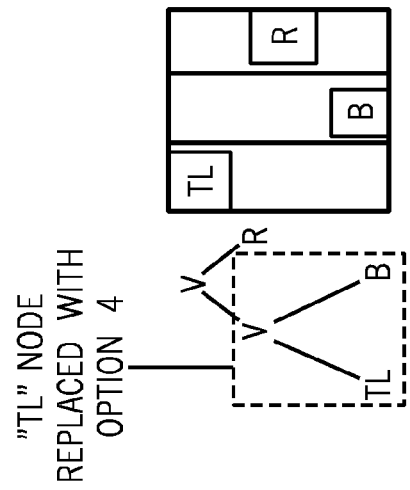

When the tree 242 of FIG. 2B is considered as the starting point, because the parent node has the "V" cut and "TL" is a left child, the valid insertions at the "TL" node position include option 2 or option 4, depicted in FIG. 6B or 6D, respectively. The insertion of option 2 at the "TL" node position of tree 242 in FIG. 2B is illustrated by FIG. 8A, while the insertion of option 4 at the "TL" node position in the tree 242 of FIG. 2B is illustrated by FIG. 8B.

Figure 9B:
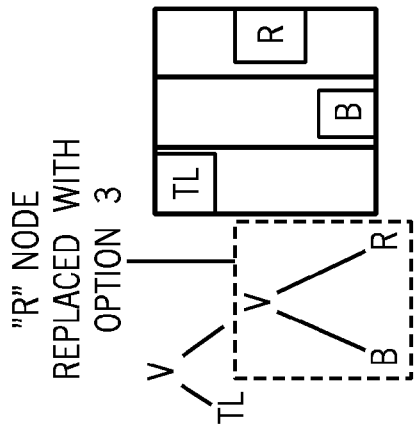
Figure 9A:
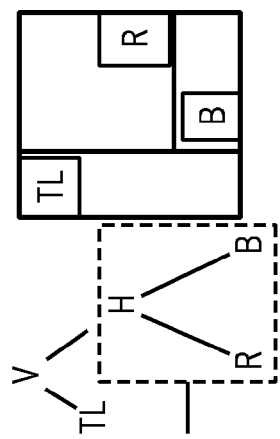

Alternatively, starting with the tree 242 shown in FIG. 2B, the "R" position can be replaced with either option 2 or option 3 depicted in FIG. 6B or 6C, respectively. Such corresponding replacements are depicted in FIGS. 9A and 9B, respectively.

Figure 10:
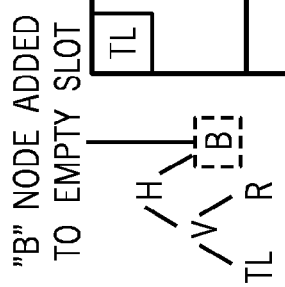

As yet a further alternative, assuming that the starting tree is tree 244 shown in FIG. 2C, the "B" exclusion zone is added to the empty slot 250 in the tree 244, as shown in FIG. 10.

Each replacement of a particular node position of a starting tree with a branch represented by any of FIGS. 6A-6D is validated by examining the combined projection code as discussed above in connection with FIG. 5.

Based on the foregoing, it is noted that there are six unique combinations of trees (shown in FIGS. 7A, 7B, 8A, 8B, 9A, and 10) for three exclusion zones. Note that FIG. 9B is not listed above since FIG. 9B depicts the same layout as FIG. 8B.

If additional exclusion zones are to be added, the process discussed above can be re-iterated to generate additional possible layouts.

FIG. 11 illustrates an example arrangement that includes a system 1100 incorporating some implementations. The system 1100 includes a template generator 1102 that is executable on one or multiple processors 1104. The processor(s) 1104 is (are) connected to storage media 1106. The storage media 1106 contains a representation 1108 of exclusion zones that are present on a page. The representation 1108 of exclusion zones is provided as an input to the template generator 1102. The template generator 1102, using techniques as illustrated in FIG. 1 or 5, produces layout representations 1110, where each layout representation represents a candidate layout that contains the exclusion zones. The layout representations 1110 can be used as templates into which images can be inserted.

The processor 1104 is connected to a network interface 1112 which connects the system 1100 to a network 1114. Various network devices 1116 are connected to the network 1114. The network devices 1116 can provide input data to the system 1100, such as images to be inserted into the templates. Alternatively, the templates as represented by the layout representations 1110 can be communicated from the system 1100 to a remote network device, where the remote network device can insert images into the templates.

The template generator 1102 can include machine-readable instructions that are loaded for execution on processor(s) 1104. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of providing a template into which images are to be inserted, comprising:
   identifying, by a system having a processor, exclusion zones on a page of the template, wherein each of the exclusion zones defines a corresponding area of the page that is free of the images to be inserted into the template;
   generating, by the system, a representation of a layout of the page, where the layout has plural partitions that divide the page, and where the representation of the layout specifies one or plural cuts in the page that define the partitions, wherein generating the representation comprises generating a tree having leaf nodes representing the exclusion zones and a non-leaf node representing one of the one or plural cuts;

providing, by the system, the exclusion zones in respective ones of the partitions; and generating, by the system, the template defined by the layout and including the exclusion zones in the partitions, wherein the template is generated prior to insertion of any image into the page.

2. The method of claim 1, wherein the non-leaf node of the tree represents a corresponding horizontal cut or vertical cut, wherein the vertical cut divides a portion of the page between a left partition and a right partition, and wherein the horizontal cut divides a portion of the page between an upper portion and a lower portion.

3. The method of claim 1, wherein generating the representation of the layout comprises:

defining a candidate cut along the page; and determining whether the candidate cut is a valid cut.

4. The method of claim 3, wherein determining whether the candidate cut is a valid cut is based on checking whether the candidate cut intersects any of the exclusion zones, wherein the candidate cut is identified as an invalid cut if the candidate cut intersects any of the exclusion zones.

5. The method of claim 4, wherein determining whether the candidate cut intersects any of the exclusion zones comprises calculating one of a horizontal projection or vertical projection to identify whether a gap exists between the exclusion zones such that the candidate cut is able to validly extend through the gap to define distinct partitions to contain the respective exclusion zones.

6. The method of claim 1, wherein generating the representation of the layout comprises:

defining plural candidate cuts in different directions along the page; and for each corresponding candidate cut of the plural candidate cuts, determining whether the corresponding candidate cut is a valid cut, wherein the layout is a first layout that corresponds to one of the plural candidate cuts that has been determined to be a valid cut, the method further comprising:

generating a representation of a second layout of the page that corresponds to another of the plural candidate cuts that has been determined to be a valid cut, wherein the second layout has an arrangement of plural partitions that divide the page, wherein the arrangement of plural partitions of the second layout is different from an arrangement of the plural partitions of the first layout.

7. The method of claim 6, further comprising:

outputting, by the system, the representations of the first and second layouts for use as plural templates for insertion of the images into the page.

8. An article comprising at least one non-transitory computer-readable storage medium storing instructions for providing a template into which images are to be inserted, the instructions upon execution causing a system having a processor to:

determine positions of exclusion zones on a page, wherein the exclusion zones define corresponding zones on the page that are free of the images to be inserted into the template;

based on the determined positions of the exclusion zones, recursively identify cuts on the page that define partitions, wherein the exclusion zones are located in respective ones of the partitions, wherein recursively identifying the cuts comprises successively considering increasing numbers of exclusion zones when identifying the cuts, wherein identifying a particular cut of the cuts comprises determining whether the particular cut is a valid cut or an invalid cut, wherein a valid cut is a cut that does not intersect any of the exclusion zones on the page, and wherein the particular cut is determined to be an invalid cut in response to determining that the particular cut intersects any of the exclusion zones on the page; and generate the template according to the defined partitions, the template including the exclusion zones, and the template being generated prior to insertion of any image into the page.

9. The article of claim 8, wherein recursively identifying the cuts on the page comprises:

identifying a first cut on the page that defines partitions to contain a first and a second of the exclusion zones; and identifying a further cut on the page to define a further partition to contain a third of the exclusion zones.

10. The article of claim 8, wherein determining whether the particular cut is a valid cut or an invalid cut comprises computing a projection code that includes a sequence of values produced based on determining whether a row or a column on the page contains any part of any of the exclusion zones.

11. The article of claim 10, wherein the particular cut is determined to be valid if the projection code contains a predefined sub-sequence that indicates that a gap exists between a pair of exclusion zones in which the particular cut can be provided without intersecting any exclusion zone.

12. The article of claim 8, wherein the page has a first number of exclusion zones, and wherein recursively identifying the cuts causes defining of a second number of partitions, wherein the second number is at least equal to the first number.

13. The article of claim 8, wherein the instructions upon execution cause the system to further:

after identifying the cuts on the page that define a sufficient number of partitions to contain the exclusion zones on the page, determine whether a layout that represents the cuts and the exclusion zones can be mutated; and in response to determining that the layout can be mutated, add a further cut on the page to define an empty partition.

14. The article of claim 8, when recursively identifying the cuts on the page to define the partitions causes production of a representation of a layout of the partitions and the exclusion zones, wherein the layout is a first layout that corresponds to the template, and wherein the instructions upon execution cause the system to further:

perform another iteration of the recursively identification of cuts on the page to produce a second layout that defines a second, different arrangement of partitions than the first layout, wherein the second layout corresponds to a second template.

15. The article of claim 14, wherein the instructions upon execution cause the system to further:

output the templates for use to insert the images.

16. A system comprising:

a storage media to store a representation of exclusion zones that exist on a page, where the exclusion zones define corresponding areas on the page that are free of images to be inserted into the page for arrangement in a collage; and at least one processor to:
  determine locations of the exclusion zones on the page;
  generate a representation of a layout on the page, where the layout has plural partitions that divide the page, where the representation of the layout specifies one or plural cuts in the page that define the partitions, wherein generating the representation comprises:
    defining a candidate cut along the page, and
    determining whether the candidate cut is a valid cut, wherein determining whether the candidate cut is a valid cut is based on checking whether the candidate cut intersects any of the exclusion zones, wherein the candidate cut is identified as an invalid cut in response to the candidate cut intersecting any of the exclusion zones; and
  output the layout as a template into which the images are to be subsequently inserted in the page, wherein the exclusion zones are provided in respective partitions of the layout.

17. The system of claim 16, wherein the one or plural cuts in the layout include one or plural horizontal or vertical cuts.

18. The method of claim 1, further comprising:
  after generating the template, inserting the images into the template.

19. The method of claim 1, wherein generating the template comprises using the representation as the template.

20. The method of claim 1, wherein each of the exclusion zones includes content selected from among background artwork on the page, pre-existing text or graphics on the page, and a blank space on the page.

21. The method of claim 20, further comprising:
  determining specific locations of the exclusion zones on the page,
  wherein the representation of the layout is generated based on the determined specific locations of the exclusion zones.

22. The article of claim 8, wherein the instructions upon execution cause the system to further:
  after generating the template, insert the images into the template.

23. The article of claim 8, wherein each of the exclusion zones includes content selected from among background artwork on the page and a blank space on the page.

24. The article of claim 8, wherein the representation comprises a tree having leaf nodes representing the exclusion zones and non-leaf nodes representing the cuts.

25. The system of claim 16, wherein the template is output prior to insertion of any image into the page.

26. The system of claim 16, wherein the representation comprises a tree having leaf nodes representing the exclusion zones, and a non-leaf node representing one of the one or plural cuts.

* * * * *